United States Patent [19]

Danstrom

[11] Patent Number: 4,970,379
[45] Date of Patent: Nov. 13, 1990

[54] BAR CODE SCANNER SYSTEM AND SCANNER CIRCUITRY THEREFOR

[75] Inventor: Eric J. Danstrom, Cedar Rapids, Iowa

[73] Assignee: Norand Corporation, Cedar Rapids, Iowa

[21] Appl. No.: 257,106

[22] Filed: Oct. 12, 1988

Related U.S. Application Data

[63] Continuation of Ser. No. 44,820, Apr. 30, 1987, abandoned.

[51] Int. Cl.$^5$ ............................................... G06K 7/14
[52] U.S. Cl. ................................... 250/205; 235/455; 235/462; 235/472; 250/568
[58] Field of Search ...................... 250/205, 566, 568; 235/455, 462, 472

[56] References Cited

U.S. PATENT DOCUMENTS 3,823,388  7/1974  Chadima et al. .
3,991,299  11/1976  Chadima, Jr. et al. ............. 235/472
4,250,488  2/1981  Haupt ................... 235/455
4,449,074  5/1984  Luchaco ............................ 250/205
4,553,081  11/1985  Koenck .
4,570,057  2/1986  Chadima, Jr. et al. ............. 235/462
4,677,287  6/1987  Ejima ................................ 250/205

Primary Examiner—Edward P. Westin
Attorney, Agent, or Firm—Neuman, Williams, Anderson & Olson

[57] ABSTRACT

In an exemplary wand type bar code scanner the scanner circuit includes a first control loop for reducing the LED driving current as the D.C. voltage level supplied to the digitizer tends to exceed a selected D.C. reference value; a second control loop becomes active when the LED is shut off by the first control loop, e.g. in the presence of sunlight. The second control loop controls the gain of the scanner amplifier so that the D.C. reference level at the input to the digitizer circuit is maintained as the scanner scans bar codes in the presence of sunlight but with the LED de-energized.

30 Claims, 4 Drawing Sheets

BAR CODE SCANNER SYSTEM AND SCANNER CIRCUITRY THEREFOR

This is a continuation of application Ser. No. 044,820, filed Apr. 30, 1987, now abandoned, the text of which is hereby incorporated by reference.

BACKGROUND OF THE INVENTION

In a wand type bar code scanner, it would be desirable if the entire scanner system were operable under a wide variety of conditions of label reflectivity and background illumination while operating with a single low supply voltage, e.g. five volts. It is found however, that a conventional digitizer circuit for the bar code signals lacks the dynamic range to handle the requisite reflected light intensity variations, with such a low supply voltage.

In the practical manufacture of optical scanner tips, it is found that there is a substantial variation in the optical parameter which is known as optical offset. Optical offset results from varying degrees of light leakage between a light emitting section and a photodetector section, and is entirely distinct from the electrical leakage current or "dark current" which is present when the light source is de-energized.

SUMMARY OF THE INVENTION

Accordingly it is an object of the present invention to provide an optical scanner system capable of handling a wider range of reflected light intensities and/or capable of operating in sunlight or other intense background illumination without requiring an increased supply voltage.

A more specific object is to provide a wand type bar code scanner utilizing a single low supply voltage and yet which is effective and reliable in reading bar code labels having a wide range of reflectivity.

Another object resides in the provision of a bar code reader capable of reading bar codes in the presence of sunlight.

A further object of the invention is to provide a bar code scanner wherein optical offset is automatically compensated, preferably at each initiation of a bar code scanning operation.

A feature of the invention relates to an optical scanner system wherein the scanner circuit is operated with only a single low supply voltage such as five volts and wherein a first control loop reduces the energization of a scanner light source with increased background reflectivity and/or wherein a second control loop progressively adjusts amplification to essentially maintain a given selected D.C. maximum input level to a digitizing circuit.

In accordance with a further feature a wand type bar code scanner is provided with control loop means for adapting the scanner automatically to scanning under a wide range of optical background conditions.

Other objects, features and advantages will be apparent from the following detailed disclosure taken in connection with the accompanying sheets of drawings, and from the individual features and relationships of the appended claims.

DETAILED DESCRIPTION

Figure 2:
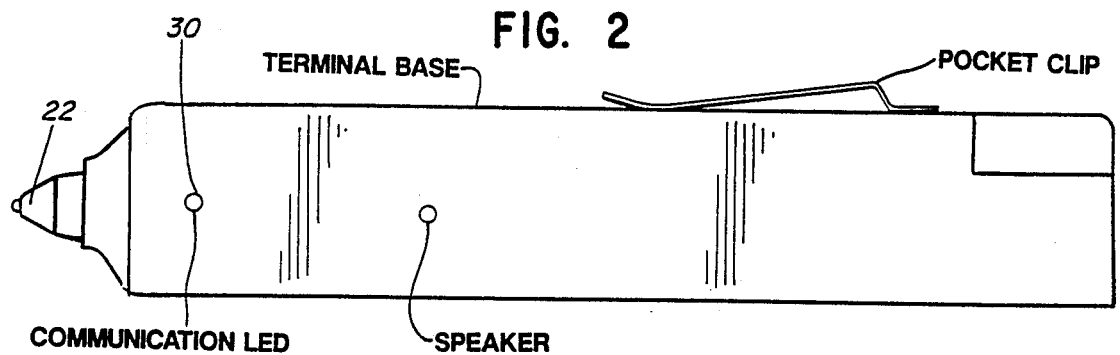
FIG. 2 is a top plan view of the device of FIG. 1.
Figure 1:
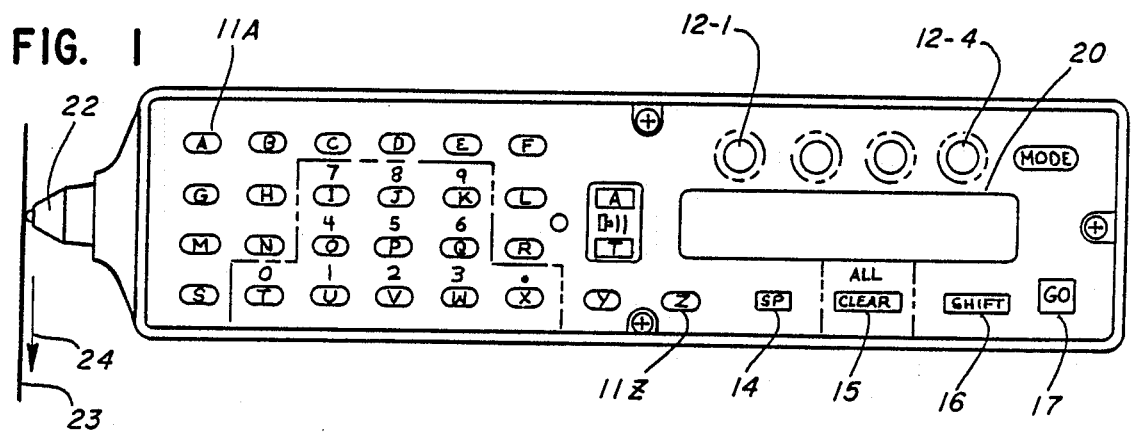
FIG. 1 is a somewhat diagrammatic elevational view showing a bar code scanner and keyboard data entry unit to which the circuit features of the present invention may be applied.
Figure 3:
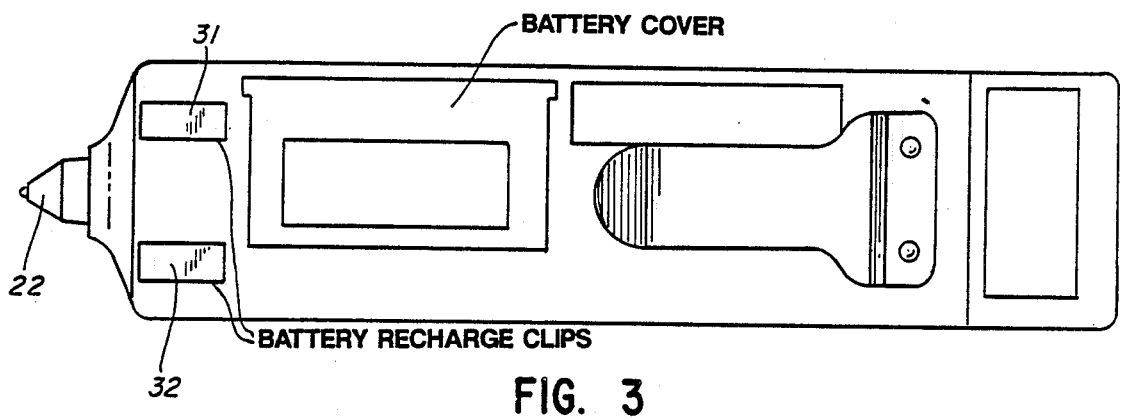
FIG. 3 is an elevational view showing the side of the device opposite to that shown in FIG. 1.

FIGS. 1, 2 and 3 show an exemplary hand-held bar code scanner and keyboard data entry unit 10 comprising a set of alphanumeric keys such as 11A and 11Z, mode control keys 12-1, 12-2, 12-3 and 12-4, and function keys 14 through 17. A display screen is indicated at 20 for displaying data as it is entered. As another mode of data entry, the unit is provided with an optical scanner tip 22 which may be of a commercially available type including a light emitting diode for illuminating optical information such as a bar code of a bar code label 23. The scanner tip may include a lens system or fiber optics for defining a pickup spot of suitable resolution such that moving the tip 22 along a bar code or the like as indicated by arrow 24 enables an optical sensor in the tip 22 to generate a complete bar code signal.

As described in U.S. Pat. No. 4,570,057 issued Feb. 11, 1986 (e.g. beginning at col. 10, line 67), a microprocessor may receive a square wave input where one logic level represents a white bar area and an opposite logic level represents a dark bar area, and store a series of counts representing the complete bar code. The processor may include a stored program algorithm to derive the bar code number. The bar code number may be exhibited on the display 20, for example, in the same way as data entered via the keys such as 11A. An example of a wand type bar code system is found in U.S. Pat. No. 3,991,299 issued Nov. 9, 1976, and assigned to the assignee of the present case; and further information is found in U.S. Pat. No. 3,823,388 issued July 9, 1974, and assigned to the instant assignee.

Coupling of a wand type scanner such as provided by unit 10 with a host computer system may take place during recharging of the unit's battery as generally taught in the aforesaid U.S. Pat. Nos. 3,823,388 issued July 9, 1974 and 3,991,299 issued Nov. 9, 1976. In FIG. 2, by way of example, an optical coupling means is indicated at 30 for optically transmitting stored data from the unit 10 during recharging of its battery. If desired the optical sensor of tip 22 may be used for transmitting control signals and the like to the microprocessor of unit 10, so as to facilitate communication. Alternatively optical port means at 30 may provide for two-way communication during battery charging operation. Conductive contacts 31 and 32, FIG. 3, associated with the battery charging circuit may be located on the opposite side of the unit 10 from the keyboard and display side. U.S. Pat. No. 4,553,081 issued Nov. 12, 1985 and also assigned to the instant assignee, illustrates battery charging systems for hand-held data terminals.

In one embodiment in accordance with FIG. 1, the bulk data storage means of the aforementioned U.S. Pat. Nos. 3,823,388 and 3,991,299 (e.g. storage means 245 in the eleventh figure of U.S. Pat. 3,991,299) is implemented as a RAM board within the unit 10, utilizing e.g. sixteen HM6264 static CMOS random access memory chips. Of course higher capacity memory chips may be utilized as this becomes economically advantageous, or where a particular application may require greater data storage capacity. An example of a microprocessor for the embodiment under discussion is an NSC800 chip. The unit 10 may contain a conventional CPU board, a conventional RAM board, and a scanner board including scanner circuitry which is to be discussed in more detail hereinafter. The scanner board may further include battery monitoring and control circuits such as shown in the aforementioned U.S. Pat. No. 4,553,081 issued Nov. 12, 1985 and such as shown in U.S. Pat. No. 4,716,354 issued Dec. 29, 1987, and assigned to the same assignee as the present case.

Other hand-held scanner systems are illustrated in a pending patent application of Dennis Alan Durbin, Raymond C. Lo, Gary A. Welsh and Stephen J. Kelly U.S. Ser. No. 897,547 filed Aug. 15, 1986, now abandoned, "Intelligent Information Card Terminal System" which is assigned to the same assignee. By way of example, such terminal units may be of shirt pocket size and contain a microcontroller with real time clock, 32K×8 EPROM, and 8K×8 scratch pad dynamic RAM memory, and 128K×8 static RAM memory. The wand scanner and optical interface of the above identified Durbin et al application Ser. No. 897,547 filed Aug. 15, 1986 may be implemented with wand scanner and optical interface circuit as shown in FIG. 4 or FIG. 5 hereof, and such a further scanner system is specifically incorporated as part of the present disclosure.

Figure 4:
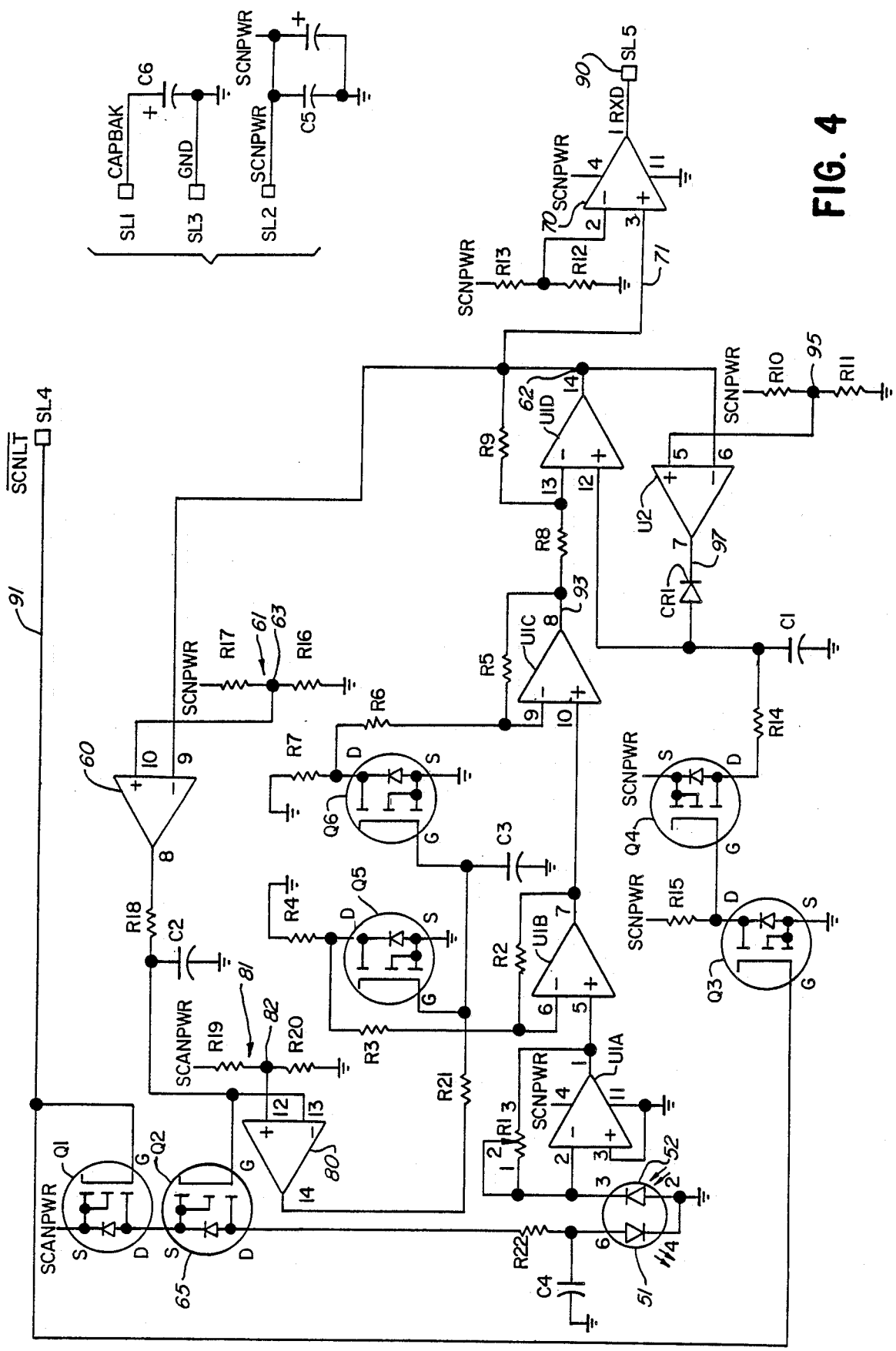
FIG. 4 shows an exemplary first embodiment of a scanner circuit in accordance with the present invention.

FIG. 4 illustrates an exemplary scanner circuit which embodies certain teachings of the present invention. In this embodiment a controllable light source means such as light emitting diode 51 and an optical sensor means such as photodiode 52 may be physically located in the optical scanner tip 22, FIG. 1, for optical coupling with a bar code of a label such as indicated at 23.

FIG. 4 may represent an embodiment which operates with a single low supply voltage, e.g. nominally five volts. It is found that with such a low supply voltage, use of the conventional digitizer technique presents a problem, particularly when the scanner is to be used with surfaces of widely different reflectances. Furthermore, conventional scanner circuits become ineffective in the presence of strong background illumination, e.g. in sunlight. In FIG. 4, a circuit is disclosed with adaptable dynamic range so as to be effective with a wide range of reflected light intensities even with a given relatively low supply voltage; furthermore, it is found that the circuit remains operative even in the presence of direct sunlight.

In the circuit of FIG. 4, operational amplifier U1A has an adjustable resistance means in the form of a potentiometer R1 for adapting the circuit to a specific individual commercially available optical scanner tip of a given type. In this way the circuit can accommodate the normal tolerance range of a given type of scanner tip by factory adjustment of the potentiometer R1. Accordingly, the input to the following information signal processing means formed by operational amplifiers U1B, U1C and U1D may have a standardized amplitude independent of tolerance variations in the gain of optical elements 51 and 52.

Basically, components U1B, U1C and U1D may provide a variable gain signal translating means which functions as a transresistance amplifier wherein the output voltage is essentially a function of the input current. In accordance with a teaching of the present invention, the output voltage of the signal translating means serves as a control signal and is supplied via error amplifier means 60 so as to control the energizing current supplied to light source means 51, thereby to maintain the output voltage at a desired D.C. level as selected at a reference voltage means 61. In the specific example of FIG. 4, error amplifier means 60 is implemented as a comparator. An output 62 of the amplifier U1D is connected to the inverting input of comparator 60, and a connection point 63 between resistors R16 and R17 of the reference voltage means 61 is connected to the noninverting input of comparator 60. A field effect transistor Q2, e.g. a P-channel MOSFET, has its gate electrode coupled with the output of comparator 60 such that the light output from light source means 51 is reduced as the reflectivity of the bar code label increases or as the level of ambient light acting on optical sensor means 52 increases. The error amplifier 60 and F-channel transistor Q2 form a transconductance amplifier which provides maximum driving current for the light emitting diode 51 when the control voltage at 62 is lower than the reference voltage at circuit point 63. By way of example, the parameters of the control loop provided by components 60, 61, and Q2 may be such that transistor Q2 is cut off when the scanner tip is reading a bar code in the presence of sunlight. In this case, since light source 51 is de-energized, the bar code is illuminated by sunlight alone and the light reflected from the bar code is resolved by the optics associated with photosensor means 52. By way of example, the photosensor means 52 under these circumstances may have a resolution of 0.5 mil (0.0005 inch) so as to be capable of reading bar codes with a minimum width of 1.5 mils (0.0015 inch), for example.

When the transistor Q1 has been turned on to supply power (SCANPWR) e.g. about 4.7 volts to the source electrode 65 of transistor Q2, if no light is reflected into the photosensor means 52, the transresistance amplifier means U1A-U1D provides an output voltage at 62 which is lower than the positive voltage at 63 for error amplifier 60, and the light source 51 is driven to a selected maximum current rating of the light source, e.g. thirty to forty milliamperes for a type HEDS1200 scanner module. When reflected light is present at photosensor 52, the output of the transresistance amplifier U1A-U1D tends to decrease below the illumination reference voltage at 63, and the control loop correspondingly decreases the current flow through light source 51 until the reflected light into sensor 52 is such that the output of the transresistance amplifier is maintained essentially at a D.C. level corresponding to the reference voltage at 63.

The circuit comprising capacitance C2 and resistance R18 serves to prevent instantaneous response of the control loop so that the potential at output 62 can fluctuate according to a bar code being scanned as indicated at 24 in FIG. 1 and thereby transmit a bar code signal to input 71 of a digitizer 70. Thus the circuit C2, R18 holds a peak value during bar code scanning such that the maximum output at 62, essentially corresponds to the positive reference voltage at 63. When the scanner tip scans a dark bar of a bar code, the transresistance amplifier output voltage at 62 decreases, changing the output of the digitizer 70. The digitizer 70 may be a comparator with positive feedback. Such positive feedback gives hysteresis in the response of the comparator.

It is found that a digitizer circuit such as indicated at 70 in FIG. 4, e.g. a comparator with positive feedback, is still lacking in sufficient dynamic range to operate when the scanner is exposed to reflected sunlight. Accordingly, in the illustrated embodiment, a second control loop including a comparator 80 is coupled with the output of peak value circuit C2, R18 and controls the gain of the transresistance amplifier so as to maintain the effectiveness of the digitizer 70 in the presence of high ambient illumination.

In accordance with the relationships of FIG. 4, a reference voltage means 81 of the second loop provides a second reference voltage at 82 which is greater than the maximum supply voltage at the source electrode 65 less the gate threshold voltage of transistor Q2. Thus when the transistor Q2 cuts off because the scanner is in sunlight, the second control loop including comparator 80 becomes active and transistors Q5 and Q6 become conductive, decreasing the gain of transresistance amplifier components UIB and UIC. With the reduced gain of the transresistance amplifier UIA-UID, the control voltage at 62 tends to be reduced toward the first reference voltage at 63, so that the maximum D.C. input voltage to the digitizer 70 remains substantially at the selected D.C. level, i.e. corresponding to the reference voltage selected at 63. Thus the digitizer 70 remains effective even in the presence of sunlight.

The following tabulation shows exemplary parameters for the scanner circuit of FIG. 4.

Exemplary Parameters For the Circuit of FIG. 4

Field Effect Transistors
Q1, Q2 Type BSS84
Q3     Type BSS123
Q4     Type BSS84
Q5, Q6 Type BSS123
Operational Amplifiers
UIA-UID    Type TLC274
60, 70, 80, U2 Type TLC27L4
Scanner Module 51, 52 HEDS1200
Diode CRI Type BAL99

Scanner Module 51, 52 HEDS1200 Diode CRI Type BAL99
Resistors (all resistances 0.125 watt with 5% tolerance except as otherwise noted)
R1 (potentiometer) zero to 100 kilohms
R2 ten megohms
R3 one megohm
R4, R5 ten megohms
R6 one megohm
R7 ten megohms
R8 one megohm
R9 ten megohms
R10 one megohm
R11 3.9 megohms
R12, R13 one megohm
R14 twenty kilohms
R15 100 kilohms
R16 one megohm
R17 3.9 megohms
R18 200 kilohms
R19 one megohm
R20 3.33 megohms
R21 200 kilohms
R22 80.6 ohms, 0.125 watt, 1% tolerance Capacitors
C1-C3 0.1 microfarad, fifty volts
C4 ten microfarads, ten volts
C5 0.1 microfarad, fifty volts
C6 0.1 microfarad, 5.5 volts
C7 ten microfarads, ten volts For the case where it is desired to use the photosensor 52 for receiving data as part of an optical coupling with a host computer, the circuit of FIG. 4 may be utilized to transmit the data signal to an output terminal 90. In this case, the transresistance amplifier will need a suitable bandwidth, e.g. twenty kilohertz. It can be determined what value of maximum feedback resistance for each component such as UIA-UID can be used for a given required bandwidth. For example, for an amplifier component such as UIA, the maximum feedback resistance value providing reasonable gain at ten kilohertz is about three megohms. This value is found in the lab empirically. Thus a number of amplifier stages are required for adequate gain with feedback resistance greater than one megohm. An example of gain of the transresistance amplifier at normal bar code scanning rates (e.g. of the order of 200 hertz) would be $13.3 \times 10^6$ ohms (i.e. the ratio of output voltage, in volts, to input current, in amperes, would be $13.3 \times 10^6$).

In FIG. 4, an early circuit for the automatic compensation of optical offset is shown as a further feedback control loop associated with amplifier U1D. In this further feedback loop, an error amplifier is comprised of comparator U2 which provides a digital output and operates to adjust the charge on capacitor C1 such as to compensate for optical offset.

In operation of this early optical offset compensating circuit, the operator may actuate a manual control such as indicated at 17, FIG. 1, to signal the start of a bar code scanning operation. At this time a signal SCNLT may become true, applying ground to control line 91 and turning on transistors Q3 and Q4 as well as transistor Q1. The result is that capacitor C1 is quickly charged up toward supply voltage. The presence of optical offset at this time produces a certain output voltage level at 93 at the inverting input to amplifier UID. The control loop including comparator U2 then serves to adjust the charge on capacitor C1 until the output at 62 corresponds essentially with a reference value at 95, FIG. 4.

With the charge on capacitor C1 set to the desired optical offset compensating level, the scanning of a bar code produces higher outputs at 93, which drive the output at 62 below the reference level at 95. The result is a relatively high voltage (e.g. 4.7 volts) at output 97 of comparator U2, such voltage causing reverse biasing of diode CR1. Thus because of the high resistance of diode CR1 (e.g. greater than 100,000 ohms) in the reverse bias condition, the charge on capacitor C1 remains at the desired value during scanning of a bar code.

Figure 5A:
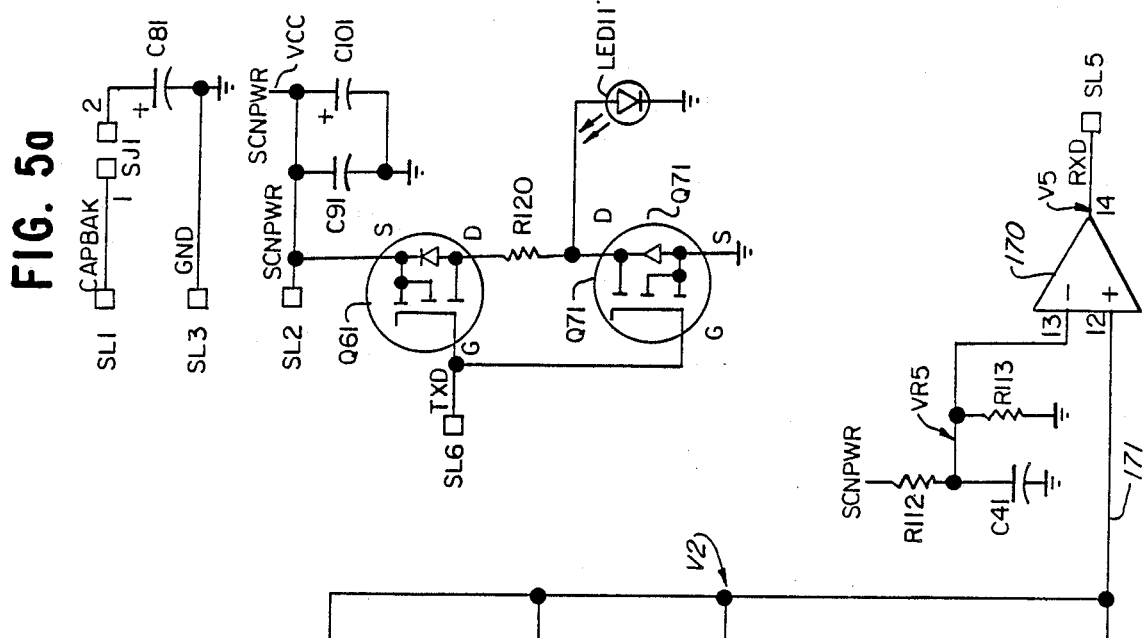
FIGS. 5 and 5A show a second embodiment of scanner circuit in accordance with the present invention.
Figure 5:
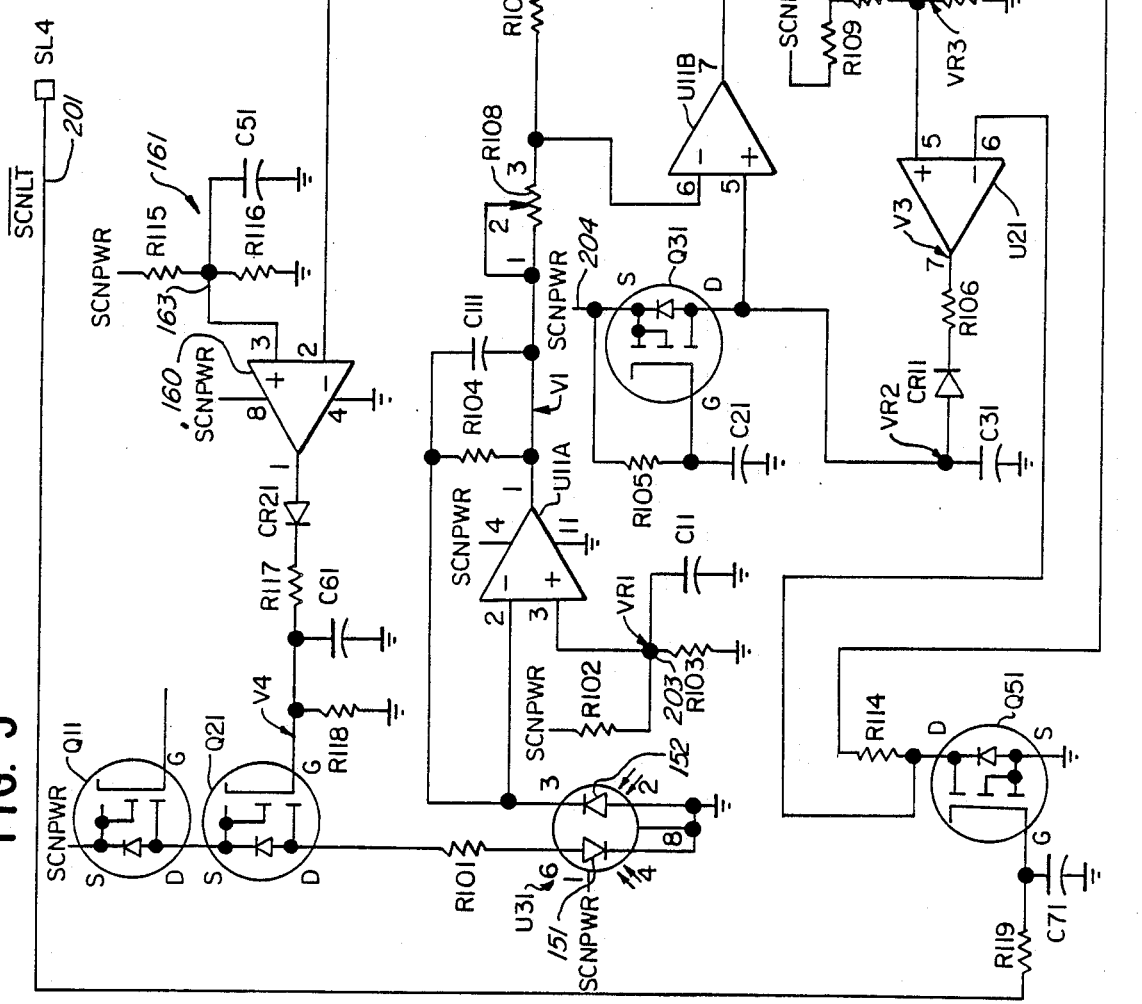
Figure 6:
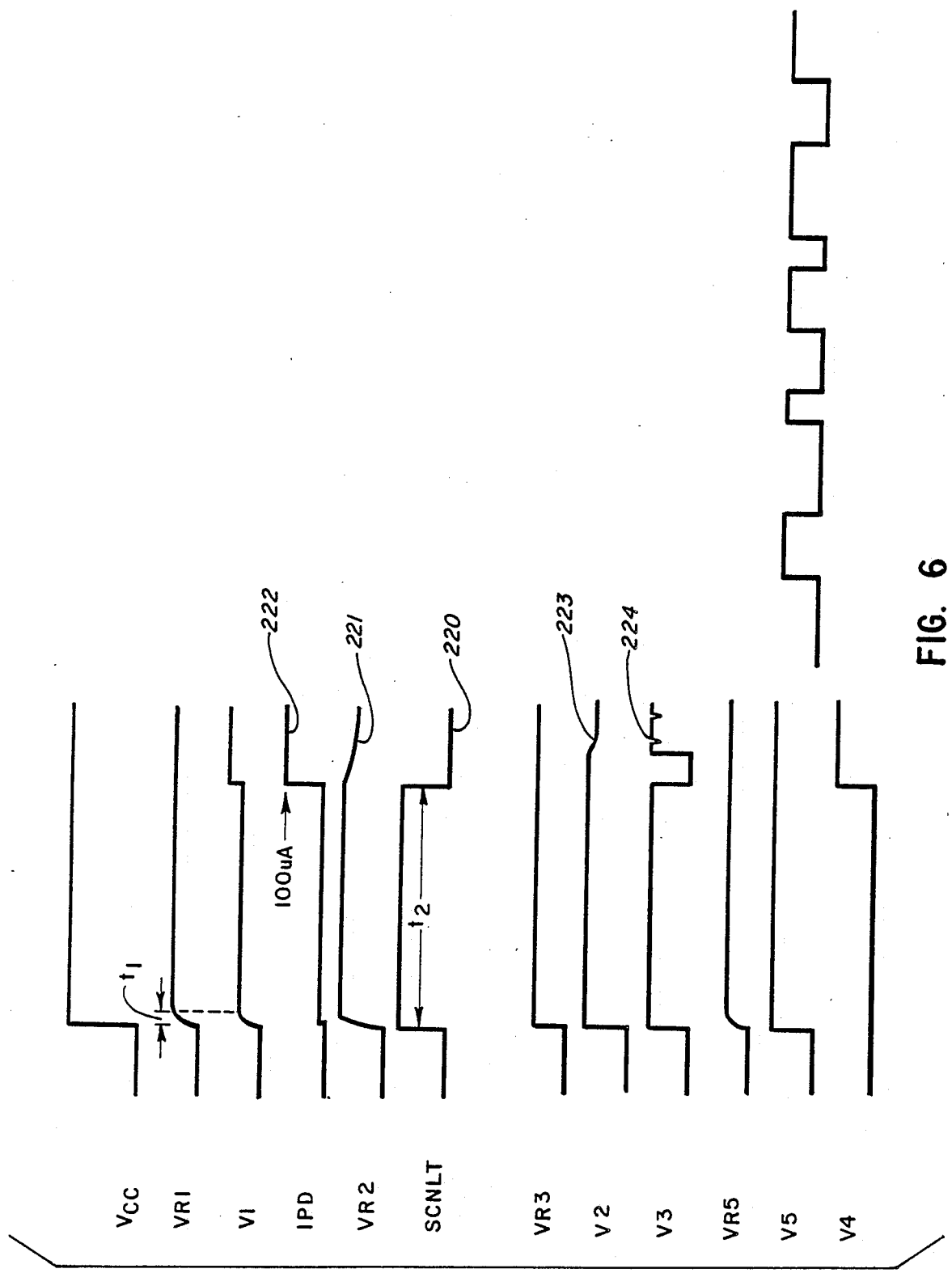
FIG. 6 is a diagrammatic indication of the related waveforms occurring in the circuit of FIG. 5 during automatic operation to compensate for optical offset.

Description of FIGS. 5 and 6

FIG. 5 illustrates a particular scanner circuit which has been successfully operated for bar code scanning and implements certain of the features described with reference to FIG. 4. In particular FIG. 5 shows an improved and presently preferred circuit for automatically compensating for optical offset. Reference numerals 151, 152, 160-163, 170 and 171 designate the components in FIG. 5 which generally correspond with components 51, 52, 60-63, 70, and 71 in FIG. 4. Thus, FIG. 5 includes a control loop including component 160 and reference voltage means 161 for controlling the supply of energizing current to the light emitting diode 151 during a bar code scanning operation. FIG. 5, however, omits the second control loop of FIG. 4 which enables scanning in the presence of sunlight.

The further control loop for automatically compensating for optical offset in FIG. 5 includes digital comparator component U21 and capacitor C31.

Referring to FIG. 6, the waveform VCC may be applied across capacitors C91 and C101 of FIG. 5A when the logic signal SCNPWR is true. By way of example, when the "GO" button 17 is manually actuated, the microprocessor may first cause the operating voltage VCC to be applied to the terminals marked "SCNPWR" in FIGS. 5 and 5A. Further, the microprocessor may cause supply potential to be applied to line 201 in FIG. 5 to turn on transistors Q11 and Q51.

As indicated by the waveform VR1 of FIG. 6, with supply potential applied across a resistor R102, and resistor R103 and capacitor C11 in parallel, the voltage at connection point 203, designated VR1, progressively increases (up to a maximum value of about 2.8 volts), the time interval t1 representing sixty milliseconds, for example.

Referring to the waveform V1 of FIG. 6 which represents the voltage at the output of amplifier U11A, this voltage will build up according to the following relationship:

$$V1 = VR1 + IPD \cdot R104 \qquad (1)$$

where IPD represents the photodetector current, and R104 is the value of resistance associated with operational amplifier U11A. As represented by the waveform IPD in FIG. 6, with the light emitting diode 151 nonconducting, only the "dark current" flows in the photodiode 152, for example about fifty picoamperes. This "dark current" is considered essentially negligible. Thus within the time interval t1 of about sixty microseconds, the voltage V1 will have reached a value of approximately 2.8 volts (corresponding to IPD=0 and VR1=2.8 volts in equation (1)). For the illustrated embodiment, the input offset voltage of amplifier U11A is about five millivolts, the input bias current is about ten picoamperes, and maximum dark current is about 200 picoamperes. With a feedback resistance of element R104 of 2.74 megohms, the dark current would provide a voltage drop between input and output of U11A of a maximum of about 0.0575 millivolt. It will be apparent that this value and the input offset voltage value are essentially negligible.

The value of time interval t1 is obtained noting that the time constant corresponding to the product of the resistance value of resistor R102 and the capacitance value of capacitor C11 is twenty milliseconds, and that capacitor C11 would be essentially fully charged within a time interval equal to three time constants.

Referring to the waveform VR2 of FIG. 6, this refers to the potential across capacitor C31. When a voltage is applied at supply line 204 associated with the source electrode of transistor Q31, transistor Q31 will be conductive because of the ground potential at its gate electrode, so that capacitor C31 will be rapidly charged to a potential of approximately 4.75 volts, for example.

Referring to the waveform SCNLT of FIG. 6, it is assumed that this will be supplied with an operating potential corresponding to that of VCC, essentially simultaneously with the application of operating potential at the terminals marked "SCNPWR". Accordingly, at this time transistor Q51 will be conducting. By way of example, the time interval t2 may have a duration of 250 milliseconds.

The waveform VR3 of FIG. 6 may refer to the potential at connection point 210 between resistors R110 and R111. When the supply potential, e.g. 4.75 volts, is applied at 211, FIG. 5, the voltage divider R109, R110, R111, provides a reference voltage of approximately 3.3 volts at the noninverting input of digital comparator U21.

The waveform V2 of FIG. 6 refers to the potential at output 162 of operational amplifier U11B. This output potential has a value as expressed in the following equation:

$$V2 = VR2 \cdot \left(1 + \frac{R107}{R108}\right) - V1 \cdot \frac{(R107)}{R108} \qquad (2)$$

It will be apparent that the value of V2 reaches its saturation value because of the substantial potential across capacitor C31 as represented by waveform VR2.

Referring to the waveform V3, representing the potential at the output of digital comparator U21, it will be observed that with transistor Q51 conducting, ground potential is supplied to the inverting input of comparator U21, so that the potential VR3 at reference point 210 produces a saturation output from U21.

The waveform VR5 increases to its reference value in the same way as described with respect to waveform VR1.

Referring to the waveform V5 of FIG. 6, the output from comparator 170, the saturation output from comparator U11B, waveform V2, produces a saturation output from comparator 170 during this time interval.

With respect to the waveform V4 of FIG. 6, corresponding to the gate potential of transistor Q21, the saturation output waveform V2 maintains the potential at V4 essentially at ground potential level.

At the end of the time interval t2 as shown in relation to waveform SCNLT, the potential at line 201 shifts to the ground potential level as indicated at 220 in FIG. 6. This signal not only turns on transistor Q11, but after a time interval turns off transistor Q51 removing ground potential from the inverting input of comparator U21. At this time as shown by waveform V3, the output of comparator U21 falls to the ground potential level, to initiate a gradual discharge of capacitor C31 as indicated at 221 in relation to waveform VR2 of FIG. 6. The readjustment of the charge on capacitor C31 is directly a function of the optical offset current IPD which reaches a corresponding value as indicated at 222. The waveform V2 shows the corresponding adjustment at 223 pursuant to equation (2) above. Once the output potential V2 of comparator U11B has been adjusted to correspond to the reference value VR3 (by means of adjustment of the charge on capacitor C31), the potential V3 returns to its saturation output level as indicated at 224.

After the setting of the capacitor charge of capacitor C31 to compensate for optical offset, the scanning of a bar code produces a modulation of the current in the photodiode 152 as represented by waveform IPD, with a corresponding output waveform at V5.

TABLE OF EXEMPLARY
PARAMETERS FOR FIG. 5

Field Effect Transistors
Q11, Q21, Q31, Q61 Type BSS84
Q51, Q71        Type BSS123
Operational Amplifiers
U11A, U11B, 170 Type TLC274ACD
U21, 160     Type TLC27L2ACD
Scanner Tip U31 HBCS-1100
Diodes
CR11, CR21  Type BAS-19
Light Emitting Diode LED11 NEC 513C
Resistors (tolerance 1% unless otherwise noted)

| | |
|---|---|
| R101, R120 | 100 ohms |
| R102, R106, R117 | 200 kilohms |
| R103 | 301 kilohms |
| R104 | 2.74 megohms |
| R105, R107, R118 | one megohm |
| R109, R116 | 100 kilohms |
| R110 | 49.9 kilohms |
| R111 | 348 kilohms |
| R112 | 267 kilohms |
| R113 | 255 kilohms |
| R114, R115 | 402 kilohms |
| R119 | 5.11 kilohms |
| R120 | 301 ohms |

Potentiometer
R108 Zero to 100 kilohms
Capacitors

| | |
|---|---|
| C11, C21, C31, C41, C51, C61, C91 | .1 microfarad fifty volts |
| C71 | .001 microfarad fifty volts, 10% |
| C81 | .22 farad 5.5 volts |
| C101 | ten microfarads ten volts |
| C111 | ten picofarads fifty volts |

In the preferred circuit of FIG. 5, the control loop means including U21 utilizes reference signal means R109, R110, R111 to define a fixed reference level such that C31 is adjusted to a desired optical offset cancelling level. Thereafter to avoid a spurious output signal, a signal level at the inverting input of U21 is changed to ground potential level during turn on of the light source means (by means of Q51).

It will be apparent that many modifications and variations may be affected without departing from the scope of the teachings and concepts of the present invention.

I claim as my invention:

1. In an optical scanner system,
    scanner means having controllable light source means for illuminating a surface containing optical information to be scanned during a scanning operation, and controllable for emitting light of adjustable intensity,
    optical sensor means for supplying an information signal varying in accordance with input optical information as it is scanned during a scanning operation, and
    a scanner circuit comprising:
    information signal translating means coupled with said optical sensor means and supplying an output signal as a function of the intensity of the input optical information, and
    control loop means coupled with said information signal translating means and controlling said light source means such that the light output from the light source means is reduced with increased average illumination of the optical sensor means, but said control loop means having a response time such that the information content of the optical information being scanned is reliably transmitted, said information signal translating means comprising variable gain signal amplifier means, and further control loop means coupled with said optical sensor means and responsive to intensities of the input optical information exceeding an effective operating range of the first mentioned control loop means for progressively reducing the gain of the signal amplifier means.

2. In an optical scanner system,
    scanner means having controllable light source means for illuminating a surface containing optical information to be scanned during a scanning operation, and controllable for emitting light of adjustable intensity,
    optical sensor means for supplying an information signal varying in accordance with input optical information as it is scanned during a scanning operation, and
    a scanner circuit comprising:
    information signal translating means coupled with said optical sensor means and supplying an output signal as a function of the intensity of the input optical information, and
    control loop means coupled with said information signal translating means and controlling said light source means such that the light output from the light source means is reduced with increased average illumination of the optical sensor means, but said control loop means having a response time such that the information content of the optical information being scanned is reliably transmitted, further control loop means for essentially shutting off said light source means in the presence of ambient light sufficient to provide for maintaining a desired dynamic range of the information signal supplied by the optical sensor means, said information signal translating means comprising variable gain signal amplifier means, and said further control loop means being coupled with said optical sensor means and responsive to intensities of the input optical information exceeding an effective operating range of the first mentioned control loop means for progessively reducing the gain of the signal amplifier means such that the system is reliably operative in the presence of sunlight.

3. In a system according to claim 2, said optical sensor means being solid state photodiode means.

4. In a system according to claim 3, said light source means being light emitting diode means receiving an energizing current of not more than thirty-five milliamperes.

5. In an optical scanner system,
    scanner means having controllable light source means for illuminating a surface containing optical information to be scanned during a scanning operation, and controllable for emitting light of adjustable intensity,
    optical sensor means for supplying an information signal varying in accordance with input optical information as it is scanned during a scanning operation, and
    a scanner circuit comprising:
    information signal translating means coupled with said optical sensor means and supplying an output signal as a function of the intensity of the input optical information, and control loop means coupled with said information signal translating means and controlling said light source means such that the light output from the light source means is reduced with increased average illumination of the optical sensor means, but said control loop means having a response time such that the information content of the optical information being scanned is reliably transmitted, said control loop means having reference circuit means for defining a reference signal level for determining a desired output signal level from the scanner circuit for the case of scanning a black region of a bar code and reference signal adjusting means for automatically adjusting the reference signal level to compensate for optical offset due to optical leakage between said light source means and said optical sensor means, said reference signal adjusting means comprising further control loop means coupled between the output of the scanner circuit and said reference circuit means for adjusting the reference signal level in accordance with an output signal from the scanner circuit during an active mode of the light source means.

6. In a system according to claim 5, said further control loop means having a time of response to black to white transitions which is long in comparison to a maximum interval between black and white signal levels due to scanning of a bar code.

7. In a system according to claim 6, said reference circuit means comprising reference capacitor means whose potential controls said reference signal level, said further control loop means adjusting the charge on said capacitance means to compensate for optical offset at each turn on of said light source means.

8. In a system according to claim 7, means operable at turn on of the light source means to pre-charge the reference capacitor means to a selected value prior to build-up of light output from said light source means to an initial operating value.

9. In a system according to claim 8, means for intermittently turning on said light source means at intervals such that the charge on the reference capacitance means is adjusted to compensate for optical offset prior to a scanning operation.

10. In a system according to claim 9, said further control loop means having further reference circuit means providing a further reference signal level for defining a fixed black responsive signal level from said scanner circuit during a scanning operation.

11. In a system according to claim 5, and means for changing a signal level at the control loop means to suppress a spurious output signal from the scanner circuit during turn on of the light source means.

12. In an optical scanner system,
scanner means having controllable light source means for illuminating a surface containing optical information to be scanned during a manual scanning operation, and controllable for emitting light of adjustable intensity,
optical sensor means for supplying an information signal varying in accordance with input optical information as it is scanned during a manual scanning operation, and
a scanner circuit comprising:
information signal translating means coupled with said optical sensor means and supplying an output signal as a function of the intensity of the input optical information, and
control loop means coupled with said information signal translating means and controlling said light source means such that the light output from the light source means is reduced with increased average illumination of the optical sensor means, but said control loop means having a response time such that the information content of the optical information being scanned is reliably transmitted,
said information signal translating means having a bandwidth in the kilohertz range and at least in the order of a hundred times that required for transmission of the manually scanned optical information in order to also transmit information received by the optical sensor means from a host computer.

13. In a system according to claim 12, said control loop means having illumination reference means for establishing an illumination reference signal and controlling said light source means to increase the intensity of illumination of a bar code when the average value of the output signal of the information signal translating means tends to fall off relative to the illumination reference signal, thereby to maintain the dynamic range of the output signal with decreasing bar code contrast without requiring an increase in power supply voltage applied to the information signal translating means.

14. In a system according to claim 13, said control loop means automatically compensating for a decreasing optical transfer function of the scanner means by correspondingly increasing the intensity of illumination of a bar code by the light source means.

15. In a system according to claim 13, said control loop means automatically reducing power consumption during scanning of relatively high contrast bar codes.

16. In a system according to claim 13, said control loop means automatically increasing the intensity of illumination of a bar code as produced by the light source means for a less favorable read angle, thereby to maintain the dynamic range of the output signal.

17. In an optical scanner system according to claim 12, said information signal translating means comprising variable gain signal amplifier means, and further control loop means coupled with said optical sensor means and responsive to intensities of the input optical information exceeding an effective operating range of the first mentioned control loop means for progressively reducing the gain of the signal amplifier means.

18. In an optical scanner system according to claim 12, further control loop means for essentially shutting off said light source means in the presence of ambient light sufficient to provide for maintaining a desired dynamic range of the information signal supplied by the optical sensor means.

19. In a system according to claim 18, said information signal translating means comprising variable gain signal amplifier means, and said further control loop means being coupled with said optical sensor means and responsive to intensities of the input optical information exceeding an effective operating range of the first mentioned control loop means for progressively reducing the gain of the signal amplifier means such that the system is reliably operative in the presence of sunlight.

20. In an optical scanner system according to claim 12, said system being operated with a supply voltage of not more than five volts and providing a dynamic range in response to bar code scanning of at least one hundred millivolts at the output of said information signal translating means over a range of bar code contrasts of at least two to one.

21. In a system according to claim 20, said optical sensor means being solid state photodiode means.

22. In a system according to claim 21, said light source means being light emitting diode means receiving an energizing current of not more than thirty-five milliamperes.

23. In an optical scanner system according to claim 12, said control loop means having reference circuit means for defining a reference signal level for determining a desired output signal level from the scanner circuit for the case of scanning a black region of a bar code and reference signal adjusting means for automatically adjusting the reference signal level to compensate for optical offset due to optical leakage between said light source means and said optical sensor means.

24. In a system according to claim 23, said reference signal adjusting means comprising further control loop means coupled between the output of the scanner circuit and said reference circuit means for adjusting the reference signal level in accordance with an output signal from the scanner circuit during an active mode of the light source means.

25. In a system according to claim 24, said further control loop means having a time of response to black to white transitions which is long in comparison to a maximum interval between black and white signal levels due to scanning of a bar code.

26. In a system according to claim 25, said reference circuit means comprising reference capacitor means whose potential controls said reference signal level, said further control loop means adjusting the charge on said capacitance means to compensate for optical offset at each turn on of said light source means.

27. In a system according to claim 26, means operable at turn on of the light source means to pre-charge the reference capacitor means to a selected value prior to build-up of light output from said light source means to an initial operating value.

28. In a system according to claim 27, means for intermittently turning on said light source means at intervals such that the charge on the reference capacitance means is adjusted to compensate for optical offset prior to a scanning operation.

29. In a system according to claim 28, said further control loop means having further reference circuit means providing a further reference signal level for defining a fixed black responsive signal level from said scanner circuit during a scanning operation.

30. In a system according to claim 23, and means for changing a signal level at the control loop means to suppress a spurious output signal from the scanner circuit during turn on of the light source means.

* * * * *